N. Starbuck.
Excavator.

N° 49,166.        Patented Aug. 1, 1865.

Witnesses:
Theo Tusch
J. W. Conyngton

Inventor
N. Starbuck
By Munn & Co Attys

UNITED STATES PATENT OFFICE.

NATHAN STARBUCK, OF WILMINGTON, OHIO.

IMPROVED DITCHING-MACHINE.

Specification forming part of Letters Patent No. 49,166, dated August 1, 1865.

*To all whom it may concern:*

Be it known that I, NATHAN STARBUCK, of Wilmington, in the county of Clinton and State of Ohio, have invented a new and Improved Ditching-Machine; and I do hereby declare that the following is a full, clear, and exact description thereof, which will enable others skilled in the art to make and use the same, reference being had to the accompanying drawings, forming part of this specification, in which—

Figure 1:
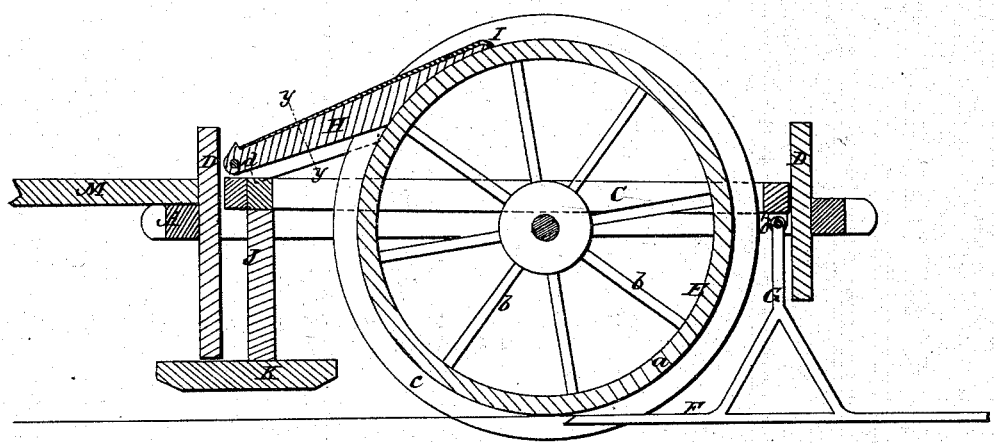
Figure 2:
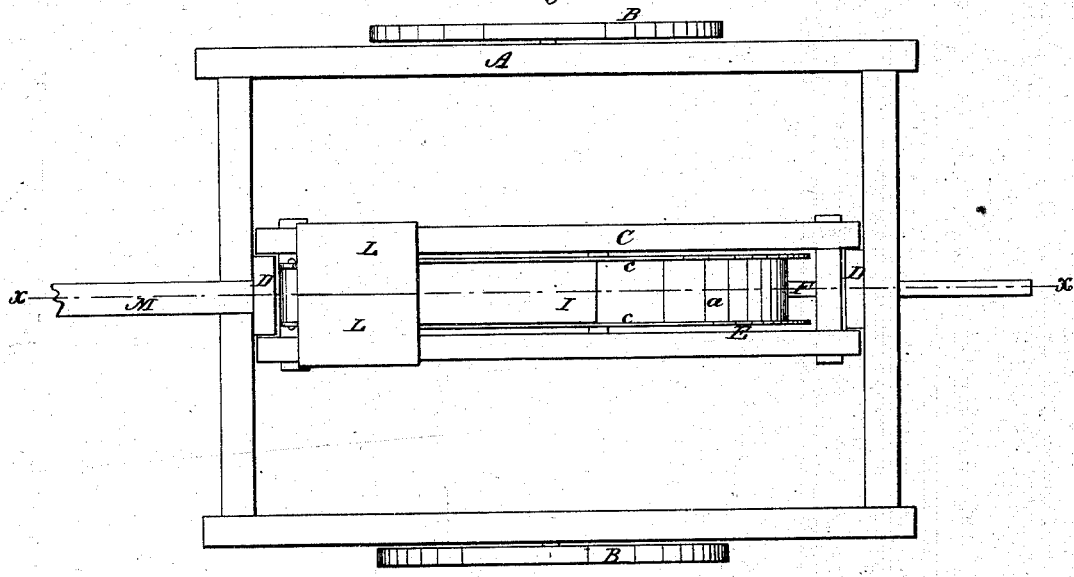
Figure 3:

Figure 1 is a side sectional view of my invention, taken in the line $xx$, Fig. 2; Fig. 2, a plan or top view of the same; Fig. 3, a transverse section of a portion of the same, taken in the line $yy$, Fig. 1.

Similar letters of reference indicate like parts.

This invention relates to a new and improved machine for excavating ditches; and it consists in the employment or use of a wheel provided with flanges for cutting the sides of the ditch, a plow for raising the earth between the cuts made by the wheel, and a scraper and inclined planes for taking the earth from the wheel and discharging it to the side of the ditch.

A represents a rectangular frame, which is mounted on two wheels, B B; and C is a smaller frame, which is fitted longitudinally in the frame A and works freely between vertical guides D D, one of which is at the front and the other at the rear of the frame A. The frame C has a wheel, E, fitted within it. This wheel E has a rim, $a$, of a width equal to the width of the ditch to be cut. The rim $a$ may be of metal and the spokes $b$ of wood. This wheel has steel flanges $c$ attached to it, which project beyond the rim $a$ of the wheel, and to the rear of the frame C there is attached a plow, F, said plow being behind the wheel E, and provided with a standard, G, the upper end of which is secured by a pivot-bolt, $b'$, to the frame C. At the front part of the frame C there is secured by a pivot, $d$, a bar, H, which rests upon the rim $a$ of the wheel E, and has a scraper, I, attached to it. At the front part of the frame C there is attached a pendant, J, having a shoe, K, at its lower end. The bar H has inclined planes L L attached to its upper surface, said planes being at opposite sides of the bar H, as shown clearly in Fig. 3.

The operation is as follows: As the machine is drawn along the flanges $c$ of the wheel E penetrate the earth and cut the sides of the ditch, the earth between the cuts being loosened and raised by the plow F. The earth carried up between the flanges $c$ of the wheel is scraped off by the scraper I and discharged at each side of the ditch or excavation by the inclined planes L.

The shoe K serves as a gage or bearing for the wheel E, as will be understood by referring to Fig. 1.

By this simple machine ditches may be cut with the greatest facility.

The device is drawn by a team, a draft-pole, M, being attached to the frame A.

I claim as new and desire to secure by Letters Patent—

1. The wheel E, provided with flanges $c$, projecting beyond the rim $a$, in combination with the plow F and scraper I, substantially as and for the purpose specified.

2. The inclined planes L L, attached to the scraper-bar H, when used in combination with the wheel E, plow F, and scraper I, for the purpose set forth.

3. The placing of the wheel, plow, and scraper within a frame, C, placed or arranged within a fame, A, substantially as and for the purpose specified.

NATHAN STARBUCK.

Witnesses:
A. C. DIBOLL,
W. B. FISHER.